Figure 6:
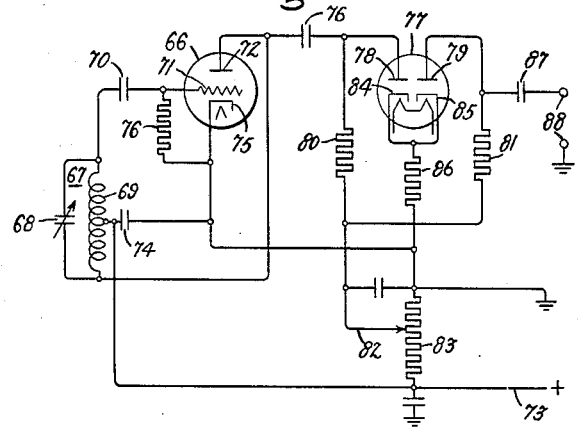

July 13, 1943.  S. BECKER  2,324,275
ELECTRIC TRANSLATING CIRCUIT
Filed June 23, 1938  2 Sheets-Sheet 1
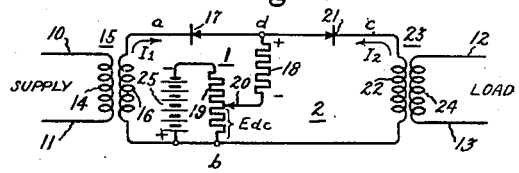
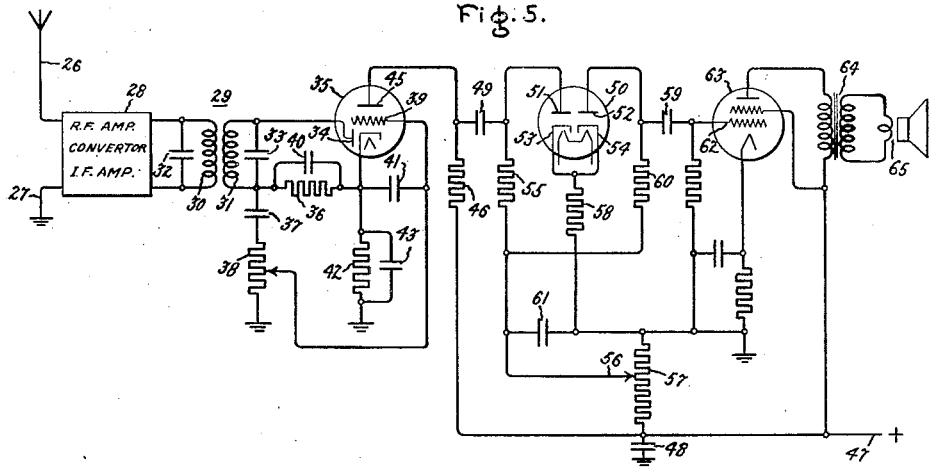
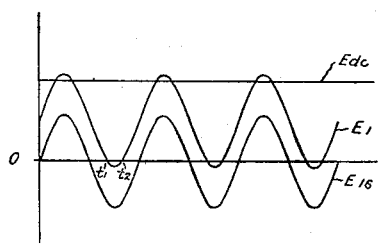
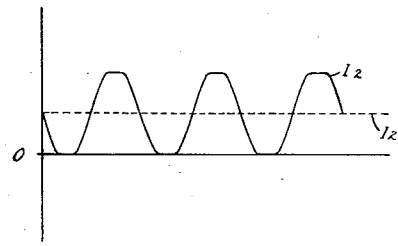
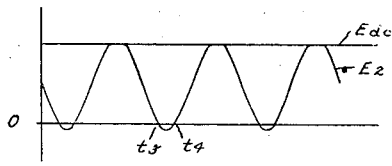
Inventor:
Stewart Becker,
by Harry E. Dunham
His Attorney.

July 13, 1943.  S. BECKER  2,324,275
ELECTRIC TRANSLATING CIRCUIT
Filed June 23, 1938  2 Sheets-Sheet 2

Inventor:
Stewart Becker,
by Harry E. Dunham
His Attorney.

Patented July 13, 1943

2,324,275

UNITED STATES PATENT OFFICE 2,324,275

ELECTRIC TRANSLATING CIRCUIT

Stewart Becker, Schenectady, N. Y., assignor to General Electric Company, a corporation of New York Application June 23, 1938, Serial No. 215,427

2 Claims. (Cl. 250—20)

My invention relates to an improved electric translating circuit and more particularly to a translating circuit having a controllable transmission characteristic. While not limited thereto, my invention is particularly suited for employment in signalling systems where the transmission of a signalling voltage must be controlled in a manner to limit the maximum amplitude of the voltage to a predetermined value.

An object of my invention is to provide an electric translating circuit in which the transmission of positive or negative or both positive and negative peaks of an alternating current potential is controlled and is limited to a predetermined maximum value.

Another object of my invention is to provide an electric translating circuit which may couple tandem connected stages of signal amplifiers and my invention contemplates the control of an energy source included in the translating circuit for the purpose of controlling and limiting to a predetermined value the maximum signal amplitude transferred through the translating circuit. As thus employed, an important advantage of my invention lies in the elimination of transient signal peaks caused by extraneous noise sources. In the operation of my invention, such transient signal peaks are limited to the predetermined amplitude to which the transmission characteristic of my translating circuit has been adjusted which is generally that of the maximum amplitude of a signal oscillation.

A further object of my invention is to provide a translatory oscillator circuit whose generated oscillations have a rectangular wave form and an amplitude which may be varied at will to be either symmetrical or unsymmetrical in any degree about a zero amplitude axis.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 illustrates my invention as embodied in an electric power translating circuit used to connect a supply source to a load source, Figs. 2, 3, 4 and 8 are curves which more fully explain the operation of my invention, and Figs. 5 to 7 inclusive illustrate embodiments of my invention as employed in signalling circuits.

Referring more particularly to Fig. 1 of the drawing, my invention is illustrated in an electric power translating circuit used to connect a supply source 10, 11 and a load circuit 12, 13. A transformer 15 has a primary 14 which is connected to the supply source 10, 11 and has a secondary winding 16 connected to energize a unidirectional current conducting path comprised by a unidirectional current conducting device 17, a resistor 18, and a selectable portion of a voltage divider resistor 19. The device 17 is connected with a polarity such that the current flow is always in the direction from the point $a$ through this device to the point $d$.

The resistor 18 and the lower half of the voltage divider resistance 19 below the movable contact 20 are connected in a second unidirectional current conducting path comprised by a unidirectional current conducting device 21 and the primary 22 of a transformer 23. The device 21 is connected with a polarity such that current flow is always in a direction from the point $c$ through this device to the point $d$. The transformer 23 is provided with a secondary winding 24 connected to supply energy to the load circuit 12, 13.

A source 25 of unidirectional current is connected across the entire voltage divider resistance 19 with a polarity, as indicated by the drawing, such that a portion of the voltage $E_{dc}$ of the source 25, determined by the particular setting of the movable contact 20 along the resistance 19, produces a unidirectional current flow through each of the devices 17 and 21 and through the resistor 18.

The operation of my translating circuit will now be explained by the aid of Figs. 2, 3 and 4 of the drawings. Assume as an initial condition that the supply source 10, 11 is deenergized. The potential $E_{dc}$ appearing across the lower portion of the resistor 19, by virtue of its connection to the source of unidirectional potential 25, produces a current in both circuits 1 and 2, these currents, of course, flowing in the same direction in resistance 18. The voltage $E_{dc}$ is represented in Fig. 2 by the curve $E_{dc}$.

Now assume that the supply source 10, 11 is energized. The alternating potential $E_{16}$ (Fig. 2) induced in the secondary winding 16 of the transformer 15 combines with the unidirectional potential $E_{dc}$ to produce in circuit 1 a voltage which is represented by curve $E_1$ of Fig. 2. Since, as represented in Fig. 2, the potential $E_1$ has a peak value in excess of the voltage $E_{dc}$, it overcomes this unidirectional voltage during the time of the alternate peaks $t_1$—$t_2$ when the two voltages oppose. During this time $t_1$—$t_2$ no current flows in the circuit by reason of the unilateral conductivity of device 17. Thus, irrespective of the magnitude of these alternate peaks, they have no effect on the subsequent parts of the system and are not transmitted to the output circuit.

The effect of circuit 2 and unilaterally conducting device 21 is to produce a similar limiting of the opposite peaks of the voltage wave. This occurs since voltage on resistance 18 due to the current $I_1$ (flowing in circuit 1 under the influence of the voltage $E_1$), which is of the form of curve $E_1$ limited to zero value during the time $t_1$—$t_2$, combines with the voltage $E_{dc}$ to produce a voltage in circuit 2 which may be represented by curve $E_2$ of Fig. 3. During the time of the peaks $t_3$—$t_4$ not previously limited, the voltage drop across resistance 18 overcomes the voltage $E_{dc}$ and tends to reverse the current in the circuit 2. This is prevented, however, by the unilateral property of device 21 with the result that during this time no current flows. Thus, both peaks are limited to a value predetermined by the voltage $E_{dc}$ and irrespective of the magnitude of the impressed voltage, the voltage supplied to the output cannot exceed a value corresponding to this predetermined value. The current $I_2$ which flows in the circuit 2 as a result of the potential $E_2$ is shown in Fig. 4. This current, which is symmetrical about an average current $I'_2$ represented by the broken line of Fig. 4, is supplied through the transformer 23 to a load device connected to the load circuit 12, 13.

Fig. 5 represents an embodiment of my invention as employed in a signalling apparatus for which it is especially well suited. In this arrangement, signal oscillations are supplied by an antenna ground system 26, 27 to signalling apparatus represented conventionally by the rectangle 28. That portion of the signalling apparatus included within the rectangle 28 may comprise tunable elements by which the apparatus is tuned to respond to a desired signal frequency, a converter by which the signal frequency is transformed to an intermediate frequency, and may also include as many stages of radio frequency and intermediate frequency amplification as desired.

The output of the apparatus represented by the rectangle 28 is coupled by a transformer 29, having a primary winding 30 and a secondary winding 31 inductively related and tuned by the respective condensers 32 and 33 to the intermediate frequency, to an anode 34 of an electron discharge device 35.

The modulation components of the signal oscillations are impressed as a unidirectional potential across the diode load resistor 36 and are coupled through a condenser 37 and resistor 38 to the control grid 39 of the electron discharge device 35. The condensers 40 and 41 are employed to by-pass radio frequency potentials around the grid 39. The cathode biasing resistor 42 and by-pass condenser 43 maintain the grid 39 at a suitable negative operating potential. The anode 45 of the electron discharge device 35 is connected through a resistor 46 to a source of positive potential 47 which is maintained at ground potential for alternating currents by a condenser 48.

The audio frequency output of the electron discharge device 35 is supplied by a condenser 49 to a translating circuit of the general type illustrated by Fig. 1 of the drawings. The unidirectional current conducting devices 17 and 21 of Fig. 1 take the form, in the present embodiment, of an electron discharge device 50 having a pair of anodes 51, 52 and a pair of cathodes 53, 54. The anode 51 is connected to the coupling condenser 49 and through a resistor 55 to the movable contact 56 of a voltage divider whose resistance 57 is connected between the positive terminal 47 of the high voltage source and ground. The cathodes 53 and 54 are connected together and through a resistor 58 to ground. The anode 52 of the electron discharge device 50 is connected to an output coupling condenser 59 and through a resistor 60 to the movable contact 56 of the voltage divider. A condenser 61 is employed to maintain the movable contact 56 at ground potential with respect to alternating currents. The condenser 59 is connected to the control grid 62 of an electron discharge device 63 whose elements are connected in conventional manner to constitute a stage of audio frequency amplification. The output of the electron discharge device 63 is supplied through an output transformer 64 to a translating device 65 which may be a loud speaker.

The operation of this embodiment of my invention will now be explained. Modulated signal oscillations are received on the antenna ground system 26, 27, are amplified, converted to an intermediate frequency, and are further amplified at the intermediate frequency by the apparatus conventionally represented by the rectangle 28. The signals thus amplified are supplied through the intermediate frequency transformer 29 to the diode anode 34 of the electron discharge device 35 where the signal oscillations are rectified and the audio frequency components of the signal oscillations appear across the resistor 36. This audio frequency potential is supplied to the voltage divider resistor 38 and a selectable portion of the voltage appearing across the resistor 38 is transferred to the grid 39 of the electron discharge device 35 for further amplification.

The output of the electron discharge device 35 is coupled by the condenser 49 to the translating circuit embodying my invention which is similar in form to and operates in the manner of the arrangement of Fig. 1. The movable contact 56 is adjusted along the voltage divider resistor 57 to impress a unidirectional potential on the anodes 51 and 52 of the device 50, this potential normally having a value such that a minute current flows from the anode 51 to the cathode 53 of the device 50 at the instant when the maximum amplitude of an audio frequency signal oscillation is supplied through the condenser 49. This adjustment of the movable contact 56 insures that the entire audio frequency cycle at maximum amplitude will be transferred to the audio frequency amplifier 63 yet limits transient noise oscillation peaks appearing in the audio frequency to the maximum amplitude of a signal oscillation as determined by the setting of the movable contact 56 on the voltage divider resistor 57. Thus, while the audio component of the modulated signal oscillation is faithfully reproduced by the translating device 65, sharp peaks of noise having intensity greater than the value determined by the movable contact 56 in its adjusted position on the voltage divider resistor 57 are eliminated. If desired, the movable contact 56 may be mechanically connected to operate with the movable contact provided on the voltage divider 38 since the maximum amplitude of signal oscillations passing through my translating circuit varies directly in proportion to the setting of the contact on the voltage divider 38.

Figure 7:
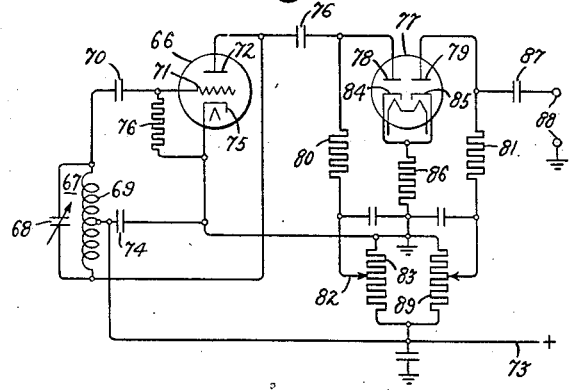

Figs. 6 and 7 illustrate my invention as embodied in an oscillator for producing oscillations having a square-topped or rectangular wave form.

In Fig. 6, an electron discharge device 66 has an anode 72, a grid 71 and a cathode 75 suitably energized and connected with certain elements to constitute an oscillator for generating oscillations of substantially sinusoidal wave form. The frequency of the generated oscillations is determined by the tuned tank circuit 67 comprised by a variable capacitor 68 and an inductance 69. The upper terminal of the inductance 69 is connected through a condenser 70 to the grid element 71 included in the device 66 while the lower terminal of the inductance is connected to the anode 72. Anode potential is supplied from a source of space current, not shown but whose negative terminal is grounded and whose positive terminal is connected to a conductor 73, through the lower half of the inductance 69 to the anode 72. A blocking condenser 74 effectively connects for currents of radio frequency the cathode 75 of the device 66 to an intermediate tap on the inductance 69 yet prevents the direct current in the conductor 73 from flowing directly to the cathode and thereby to ground. A resistor 76 in combination with the condenser 70 impresses a suitable negative operating potential upon the grid 71 of the electron discharge device 66.

Oscillations of sinusoidal wave form generated by the electrol discharge device 66 and its associated circuit elements are supplied through a condenser 76 to a wave form changing circuit where their wave form is changed to a rectangular wave form and where the amplitude of the positive and negative half cycles is controlled at will to control the rectangular shape of the wave form. This wave form changing circuit is comprised by an electron discharge device 77 whose anodes 78 and 79 are respectively connected through resistors 80 and 81 to the movable contact 82 of a voltage divider 83. The voltage divider 83 is connected between the conductor 73 and ground. The cathodes 84 and 85 of the electron discharge device 77 are connected together and through a common resistor 86 to ground. Oscillations of changed wave form appearing across the resistor 81 are supplied through a condenser 87 to a pair of output terminals 88 where the oscillations of changed wave form may be supplied to other signalling apparatus, not shown.

Figure 8:
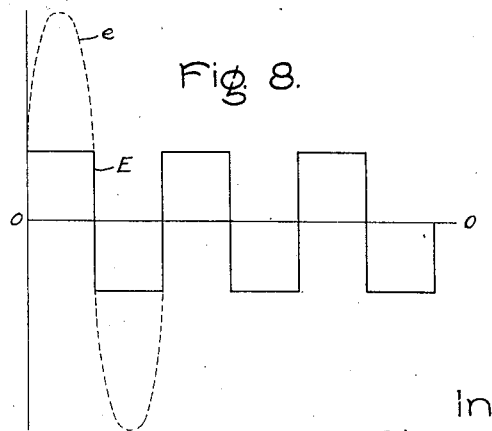

The operation of this rectangular wave form generator will now be explained by reference to the curves of Fig. 8. Oscillations of substantially sinusoidal wave form, represented in Fig. 8 by the broken curve e, are generated by the electron discharge device 66 and associated circuit elements. These sinusoidal oscillations are supplied through the condenser 76 to the wave form changing circuit comprised by the electron discharge device 77 and associated circuit elements which operate much in the manner of the translating circuit shown connected between the tandem stages of audio frequency amplification in the arrangement of Fig. 5. The operation of the present arrangement differs, however, from that of the Fig. 5 circuit in that the amplitude of the sinusoidal oscillations supplied through the condenser 76 is preferably made quite large and only the lower portions of the sinusoidal oscillations are allowed to pass to the output terminals 88. The effect of thus cutting off the upper portion of the positive and negative half cycles of the sinusoidal oscillations is to produce at the output terminals 88 oscillations having a substantially rectangular wave form represented by the solid line E of Fig. 8. The amplitude of the positive and negative half cycles of the potential E may be controlled by adjustment of the position of the movable contact 82 along the voltage divider 83. The potential E oscillates in a symmetrical manner about the zero amplitude axis 0—0 of Fig. 8.

The oscillator arrangement of Fig. 7 is similar to that of Fig. 6 except that the amplitude of the positive and negative half cycles of potential supplied to the output terminals 88 may be individually controlled at will in order that the potential E may be made symmetrical or non-symmetrical about the zero amplitude axis 0—0 as desired. Elements in this figure corresponding to like elements of Fig. 6 are designated by like reference characters. In this embodiment of my invention, the potential supplied to the anode 78 of the electron discharge device 77 is controlled by a first voltage divider 83 while the potential supplied to the anode 79 is independently controlled by the provision of a second voltage divider 89. This allows the amplitude of the positive and negative half cycles of the voltage E to be varied at will thereby to control the symmetry or lack of symmetry of the voltage E about the axis 0—0. It will be evident that with this arrangement, either the negative or the positive half cycles of the potential E may be reduced to zero if desired without affecting the wave form of the remaining half cycle of potential.

While I have shown in the arrangements of Figs. 1 and 5 a single source of unidirectional potential connected to supply current through each of the unidirectional conducting devices, it will be understood that this is by way of illustration only and that individual sources of unidirectional potential may be supplied for each of the unidirectional current conducting devices in the manner of Fig. 7. Where individual sources are employed, individual voltage dividers are preferably used with a single source in the manner of the Fig. 7 circuit to control the portion of the total potential of the source which it is desired to introduce into each unidirectional current conducting path, and it will be clear from the above description that one such path controls the maximum amplitude of the positive half cycle while the other path controls the maximum amplitude of the negative half cycle of voltage or current appearing in the load or output circuit.

While I have shown particular embodiments of my invention, it will of course be understood that I do not wish to be limited thereto since many modifications may be made both in the mechanical arrangement and the instrumentalities employed, and I, therefore, contemplate by the appended claims to cover any such modifications as fall within the true spirit and scope of my invention.

What I claim as new and desire to secure by Letters Patent of the United States is:

1. A static eliminator having, in combination with a receiving system, a condenser connected with the receiving system, a tube having a cathode and an anode and connected with the condenser so that signals received by the receiving system shall be transmitted through the condenser and the tube in the direction from the cathode towards the anode for a positive half wave and from the anode towards the cathode for a negative half wave, a potentiometer, means for connecting the positive terminal of the potentiometer to the anode, means for connecting the negative terminal of the potentiometer to the cathode, and means for adjusting the potentiometer to maintain the anode positive with respect to the cathode to a degree less than the voltage corresponding to the static to be eliminated from the signals.

2. A static eliminator having, in combination with a receiving system, a condenser connected with the receiving system, a tube having a cathode and an anode and connected with the condenser so that signals received by the receiving system shall be transmitted through the condenser and the tube in the direction from the cathode towards the anode for a positive half wave and from the anode towards the cathode for a negative half wave, a potentiometer, two resistors, means for connecting the positive terminal of the potentiometer through one of the resistors to the anode, means for connecting the negative terminal of the potentiomter through the other resistor to the cathode, and means for adjusting the potentiometer to maintain the anode positive with respect to the cathode to a degree less than the voltage corresponding to the static to be eliminated from the signals.

STEWART BECKER.